Figure 1:
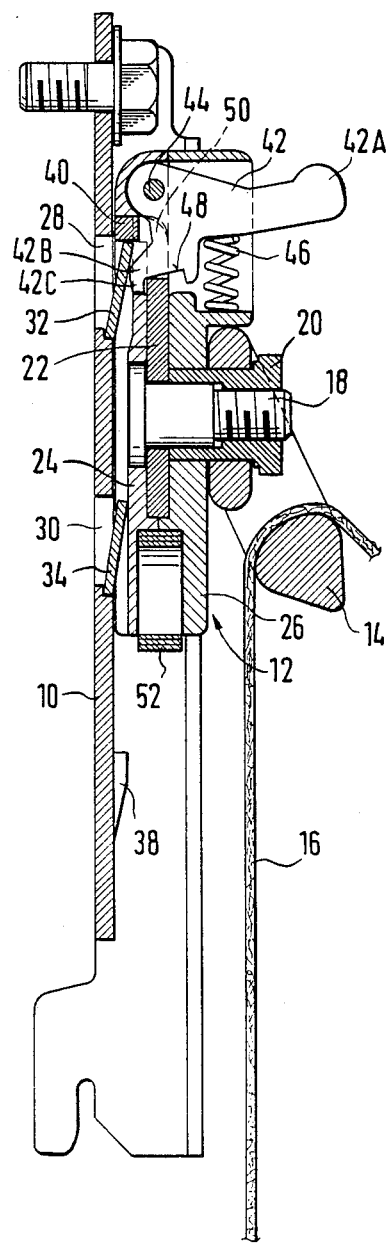

United States Patent [19]

Biller et al.

[11] Patent Number: 4,872,704
[45] Date of Patent: Oct. 10, 1989

[54] DEVICE FOR HEIGHT ADJUSTMENT OF A SAFETY BELT FITTING

[75] Inventors: Dieter Biller, Mutlangen; Joachim Biller, Leinzell, both of Fed. Rep. of Germany

[73] Assignee: TRW Repa GmbH, Alfdorf, Fed. Rep. of Germany

[21] Appl. No.: 226,051

[22] Filed: Jul. 29, 1988

[30] Foreign Application Priority Data

Sep. 30, 1987 [DE] Fed. Rep. of Germany ....... 3733026

[51] Int. Cl.[4] ............................................. B60R 22/20
[52] U.S. Cl. ..................................... 280/808; 297/483
[58] Field of Search ............... 280/801, 807, 808, 803, 280/804; 297/468, 483, 353, 480

[56] References Cited

U.S. PATENT DOCUMENTS

| | | | |
|---|---|---|---|
| 4,538,832 | 9/1985 | Anderson | 280/808 |
| 4,569,537 | 2/1986 | Else | 280/808 |
| 4,640,550 | 2/1987 | Hakansson | 280/808 |
| 4,652,012 | 3/1987 | Biller et al. | 280/808 |
| 4,681,347 | 7/1987 | Tamura et al. | 280/808 |
| 4,729,581 | 3/1988 | Ono | 280/808 |

FOREIGN PATENT DOCUMENTS

| | | |
|---|---|---|
| 0086633 | 8/1983 | European Pat. Off. . |
| 3225862 | 1/1984 | Fed. Rep. of Germany . |
| 3406047 | 2/1985 | Fed. Rep. of Germany . |
| 3431678 | 8/1985 | Fed. Rep. of Germany . |
| 3521023 | 12/1985 | Fed. Rep. of Germany . |

Primary Examiner—Richard A. Bertsch
Attorney, Agent, or Firm—Tarolli, Sundheim & Covell

[57] ABSTRACT

The device for vertical adjustment of a safety belt fitting consists of a load-receiving guide rail and an anchoring element which is vertically displaceable in said rail and to which the safety belt fitting is anchored. Said anchoring element carries a load-receiving stop portion which cooperates with spring-loaded pawls which project into the linear path of movement of said rigid stop portion unless they are pressed by a release element into their release position. Said release position comprises apart from an actuating extension a blocking extension which in the actuated state of the release element projects into the path of movement of the rigid stop portion and consequently also cooperates with the pawls. Unintentional skipping of the respective next lower detent position is made impossible by this construction.

9 Claims, 4 Drawing Sheets

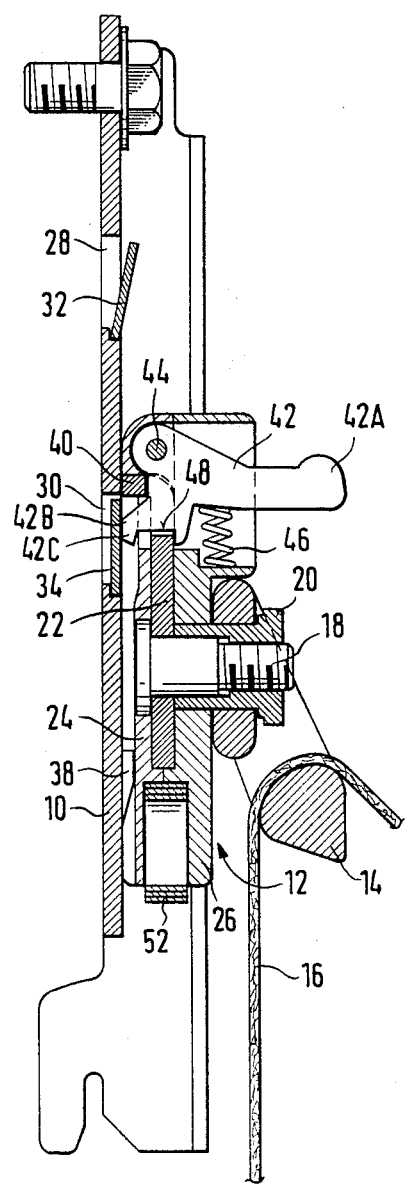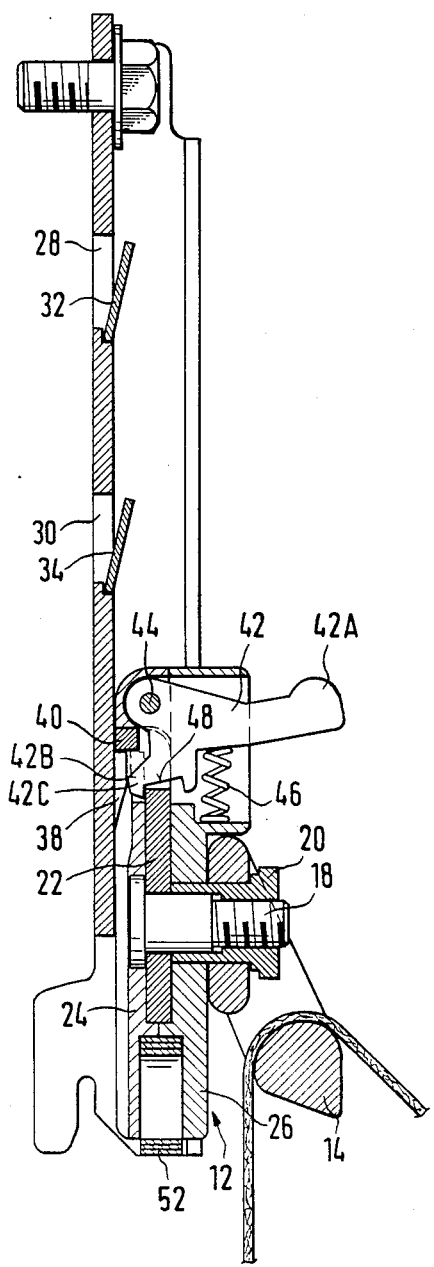

DEVICE FOR HEIGHT ADJUSTMENT OF A SAFETY BELT FITTING

The invention relates to a device for height adjustment of a safety belt fitting in motor vehicles, comprising a load-receiving guide rail equipped for securing to the vehicle, an anchoring element which is displaceably accommodated in said guide rail and to which the safety belt fitting is secured, and a detent means comprising a plurality of detent elements spaced apart in the longitudinal direction of the guide rail, a detent element on the anchoring element cooperating with said detent elements and a release element cancelling the locking between the detent elements in the actuated state.

Such devices are known in numerous forms. Generally, the release element of such a device is formed as a lever and by actuating said lever a spring-loaded detent pawl or the like is moved into its release position. The pawl is mounted on the displaceable anchoring element and cooperates with detent openings of the guide rail spaced apart in the longitudinal direction. As long as the release element remains actuated the pawl cannot drop into one of the detent openings. On downward adjustment of the safety belt fitting one may thus easily skip the detent opening disposed at the desired height. To find the respective nearest detent opening with certainty the user must take a considerable amount of care.

The present invention provides an improved device of the type mentioned above, wherein the setting of the safety belt fitting to the next lower detent position is readily and positively ensured.

In the height adjusting device according to the present invention the release element comprises a blocking extension which in the actuated state of the release element and on downward displacement of the anchoring element describes a path which meets the respective detent element of the guide rail. This configuration of the vertical adjustment device makes it impossible to unintentionally skip a detent position. As long as the release element is actuated for performing a downward adjustment of the safety belt fitting the blocking extension of the release element moves along a path which necessarily encounters the next lower detent element. If however after cancelling of the locking the actuation of the release element is removed and the downward movement of the safety belt fitting continued for example by direct engagement on said fitting the locking takes place automatically in the next lower detent position.

In contrast to conventional forms of vertical adjustment devices for safety belt fittings, in which the detent elements of the guide rails are formed as detent openings and the detent element on the anchoring element is a pawl, in a preferred embodiment of the invention the detent elements of the guide rails are each formed as a pawl movable against spring force out of the normal detent position into a release position. In advantageous further development of this embodiment the detent element of the anchoring element is constructed as rigid stop member into the path of movement of which the pawls project in their detent position. The constrained locking in the respective next lower detent position is achieved in this embodiment in particularly simple manner.

In a further advantageous embodiment the release element is constructed as two-armed lever, the one lever arm serving as actuating lever and both the actuating extension and the blocking extension being formed on the other lever arm. The lever is preferably pivotal within a range defined by stops and is biased by a spring into the unactuated position.

Figure 7:
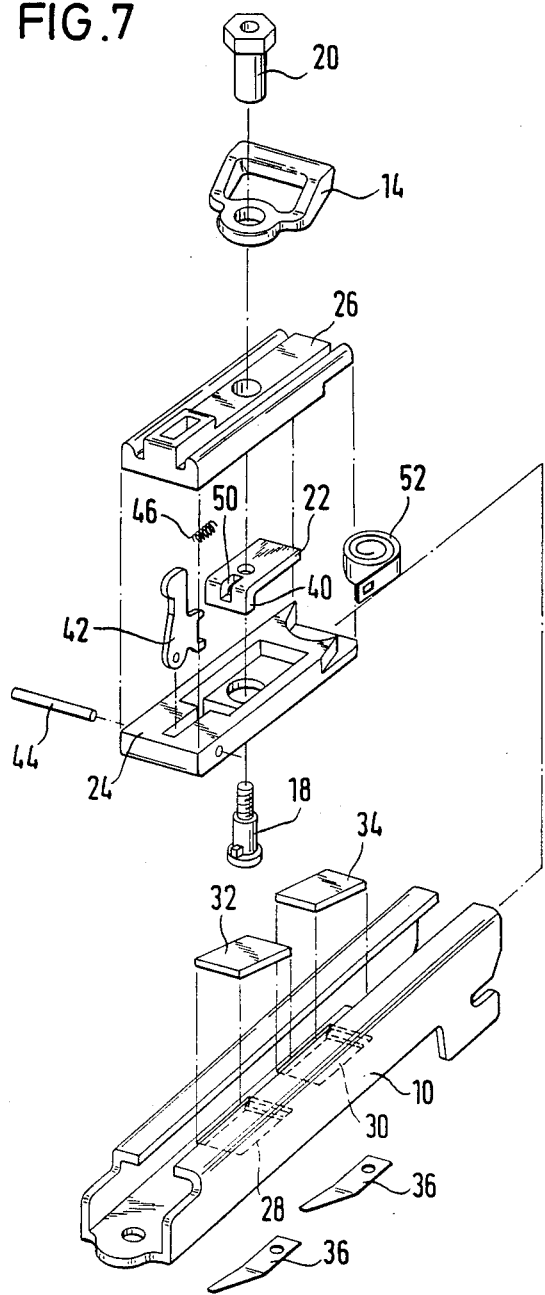

Further features and advantages of the invention will be apparent from the following description of a preferred embodiment and from the drawings to which reference is made and wherein:

FIGS. 1 to 6 are schematic longitudinal sections of the device in various positions; and FIG. 7 is an exploded view of the device.

A load-receiving guide rail 10 intended for securing to the B post of a motor vehicle forms on the inside a linear guide track for a slidable anchoring element which is designated generally by 12. A safety belt deflecting fitting 14 for a safety belt 16 is anchored pivotally to said anchoring element 12 by means of a threaded bolt 18 and a sleeve-shaped nut 20. The load-receiving element of the anchoring element 12 is formed by a plate 22 of steel which is mounted between two outer housing members 24, 26 of the anchoring element 12 and comprises an opening through which the bolt 18 is led. The guide rail 10 comprises in its centre web two rectangular openings 28, 30, the lower edge of each of which is formed as pivot bearing of a plate-shaped pawl 32, 34. The pawls 32, 34 are pivotal at their lower edge between a detent position which is inclined out of the plane of the centre web of the guide rail 10 and into which they are each biased by a leaf spring 36 and a release position which lies substantially in said plane and in which they penetrate into the associated openings 28 and 30 respectively. The position of the openings 28, 30 corresponds in each case to a detent position of the anchoring element 12 within the guide rail 10. In the embodiment shown a total of three detent positions is provided, the two upper corresponding to the openings 28, 30 and the lowest being defined by a fixed detent element 38 which is raised out of the centre leg of the guide rail 10 in the inward direction.

Figure 4:
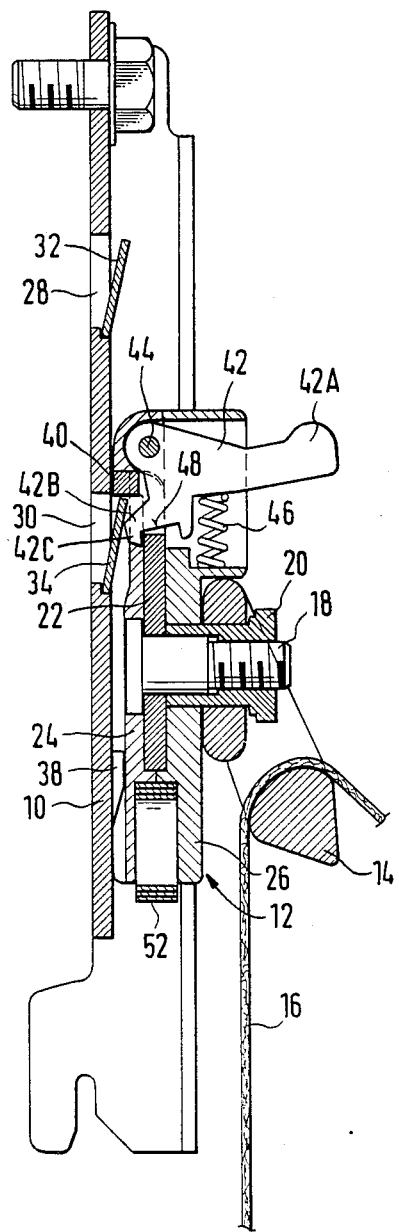

A detent element on the anchoring element 12 cooperates with the pawls 32, 34 and the detent element 38 and said element 12 is formed by a rigid stop portion 40 bent perpendicularly from the plate 22. The rigid stop portion 40 moves with the displaceable anchoring element 12 on a linear path of movement into which the upper edges of the pawls 32, 34 project when the latter are in their detent position, as does the upper edge of the detent element 38. In FIGS. 1, 4 and 6 the three detent positions are illustrated in which the stop portion 40 at the upper edge of the pawl 32 or the pawl 34 or the detent element 38 is arrested in loadreceiving manner.

Figure 2:
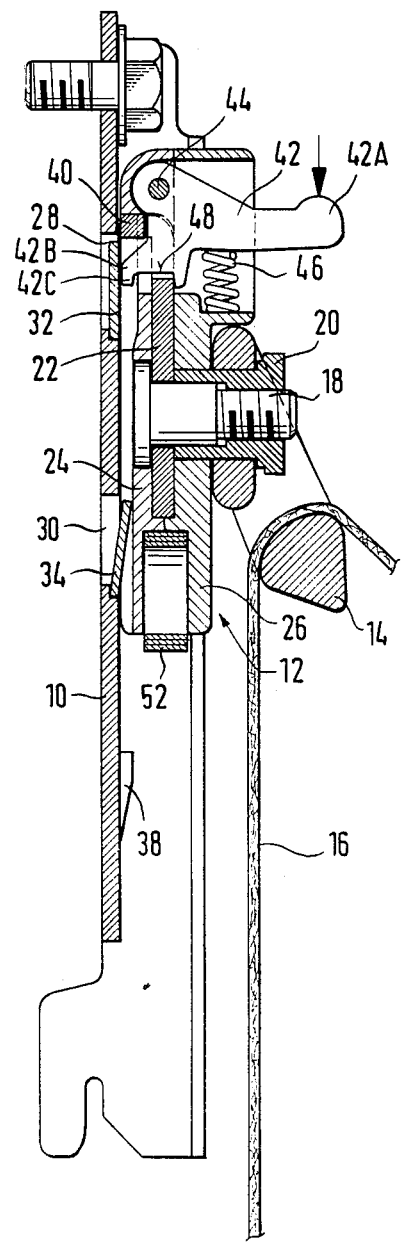
Figure 3:
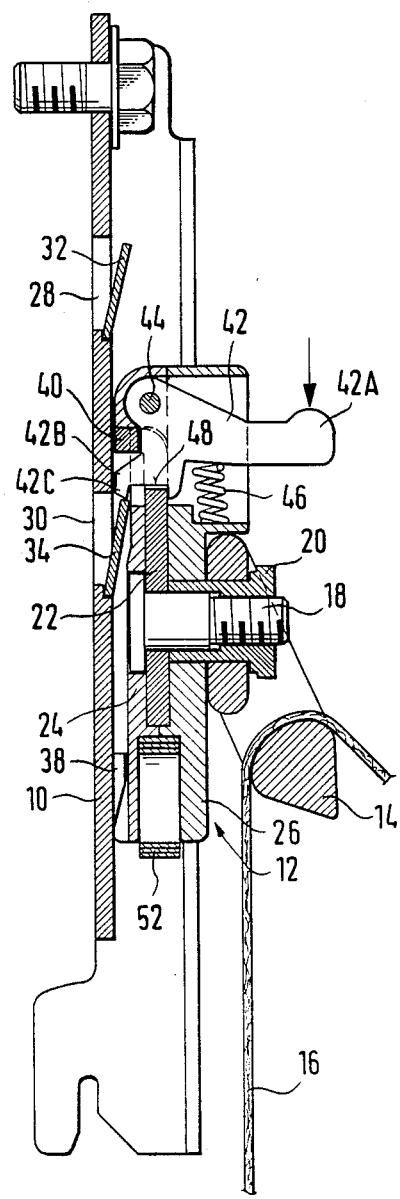

To release the locking in the upper or centre detent position a release element 42 is provided which is formed as two-armed lever which is mounted pivotally about a pin 44 on the housing member 24 and the one arm of which forms an actuating lever 42A whilst an actuating extension 42B and a blocking extension 42C are formed on the other arm. The release element 42 is urged by a spring 46 into the unactuated position. In this position the actuating extension 42B bears on the pawl 32 or 34 disposed in its detent position. By pivoting the release element 42 in the clockwise direction in which the actuating lever 42A is depressed in the direction of the arrow in FIG. 2 the pawl 32 or 34 is pressed via the actuating extension 42B into its release position. As shown in FIG. 2 the rigid stop portion 40 then comes free of the pawl 32 so that the anchoring element 12 can be moved downwardly.

If during this downward movement the actuating lever 42A is kept depressed the blocking extension 42C projects into the path of movement of the stop portion 40 into which the upper edge of the pawl 34 also projects.

Consequently, the blocking extension 42C is blocked at the pawl 34. A further downward movement of the anchoring element 12 is not possible. When the actuating lever 42A has returned to its inoperative position the anchoring element 12 can still be moved slightly downwardly until the rigid stop portion 40 comes to bear on the upper edge of the pawl 34 (FIG. 4). In this unactuated state as well no further downward movement is possible. Unintentional skipping of a detent position is therefore fundamentally impossible. This means that a certain and specific easy setting to the respective next lower detent position is ensured.

The operation described above for the downward movement from the upper to the centre detent position is repeated for the downward movement from the centre to the lower detent position. This is illustrated in FIGS. 5 and 6.

The embodiment described has several other special features. Thus, the release element 42 is pivotal to an extent limited by stops between its inoperative position and its actuating position. Said stops are formed by the opposing spaced-apart edges of a rectangular cutout 48 in the arm of the two-armed lever on which the actuating extension 42B and the blocking extension 42C are also formed. Said lever arm engages through a slot 50 of the plate 22 (FIG. 7). The width of the rectangular cutout 48 is greater than the thickness of the plate 22 so that the parallel edge walls of said cutout 48 come to bear on the front side and rear side respectively of the plate 22 to define the two positions of the release element 42.

At the lower end of the two housing members 24, 26 a downwardly open partially cylindrical recess is also formed which receives a spirally coiled spring 52. The free end of said spring 52 is attached to a suitable point of the guide rail 10. The spring 52 exerts an upwardly directed tension on the anchoring element 12 to compensate the downwardly directed tension exerted by the safety belt 16.

The number of detent positions provided depends on the particular requirements. In the lowermost position it is not necessary to provide a pivotal pawl like the pawls 32, 34 but only a rigid detent element like the detent element 38. To avoid obstructing the movement of the anchoring element 12 the rigid detent element 38 is provided with a central longitudinal slot into which the pivotal detent element 42 can penetrate.

FIG. 7 shows the constructional form of the device and at the same time clearly shows that said device consists only of a few simple components which are easy to assemble so that the desired specific certain and easy finding of the respective next lower detent position is achieved without particular expenditure.

We claim:

1. A device for the height adjustment of a safety belt fitting in motor vehicles, comprising a load-receiving guide rail adapted to be mounted in a vehicle, an anchoring element which is displaceably accommodated in said guide rail and to which said safety belt fitting is secured, a detent means comprising a plurality of pawl members spaced apart in the longitudinal direction of said guide rail which pawl members are movable against spring force out of a normal locking position into a release position, a latch element on said anchoring element cooperating with said pawl members for locking engagement therewith, and a release element for releasing the locking between said latch element and said pawl members in an actuated state thereof, said release element being mounted on said anchoring element and having a blocking extension which in the actuated state of said release element and upon downward displacement of said anchoring element engages the first pawl member encountered on said downward movement to stop downward displacement of said anchoring element, said pawl members when in said release position being located out of the path of movement of said blocking extension.

2. A device for the height adjustment of a safety belt fitting in motor vehicles, comprising a load-receiving guide rail adapted to be mounted in a vehicle, an anchoring element which is displaceably accommodated in said guide rail and to which said safety belt fitting is secured, and a detent means comprising a plurality of detent element spaced apart in the longitudinal direction of said guide rail, a latch element on said anchoring element cooperating with said detent elements for locking engagement therewith, and a release element releasing the locking between said latch element and said detent elements in an actuated state thereof, said release element comprising a blocking extension which in the actuated state of said release element and upon a downward displacement of said anchoring element describes a path which meets any of said detent elements which is the first detent element encountered on said downward movement to be stopped at said first detent element, said detent elements with the exception of a lowermost one of said detent elements being each formed as a pawl member which is movable against spring force out of a normal locking position into a release position out of said path described by said blocking extension.

3. The device according to claim 2, wherein said latch element includes a rigid stop portion having a path of movement into which said detent elements project in their normal locking positions.

4. The device according to claim 2, wherein said release element comprises an actuating extension which in the actuated state of the release element presses the detent element into its release position.

5. The device according to claim 4, wherein said blocking extension and said actuating extension are disposed on a same arm of said release element.

6. The device according to claim 2, wherein said release element is formed as a lever which is pivotally mounted on said anchoring element.

7. The device according to claim 6, wherein said release element comprises an actuating arm and a second arm on which said blocking extension is formed.

8. The device according to claim 6, wherein said release element has a pivot range limited by stop members.

9. The device according to claim 2, wherein a lowermost of said detent elements is formed as a rigid stationary detent element projecting into an inner space defined by said guide rail.

* * * * *

UNITED STATES PATENT AND TRADEMARK OFFICE
CERTIFICATE OF CORRECTION

PATENT NO. : 4,872,704

DATED : October 10, 1989

INVENTOR(S) : Dieter Biller and Joachim Biller

It is certified that error appears in the above-identified patent and that said Letters Patent is hereby corrected as shown below:

Column 4, Line 24, Claim 2, Change "element" to --elements--.

Signed and Sealed this

Eighteenth Day of September, 1990

Attest:

HARRY F. MANBECK, JR.

*Attesting Officer*   *Commissioner of Patents and Trademarks*